United States Patent
Otsubo et al.

(10) Patent No.: US 9,658,610 B2
(45) Date of Patent: *May 23, 2017

(54) DISPLACEMENT AND POSITION MEASUREMENT IN MACHINE TOOL

(71) Applicant: MURATA MACHINERY, LTD., Kyoto-shi, Kyoto (JP)

(72) Inventors: Tsutomu Otsubo, Inuyama (JP); Atsushi Nakagawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 421 days.

This patent is subject to a terminal disclaimer.

(21) Appl. No.: 14/274,980

(22) Filed: May 12, 2014

(65) Prior Publication Data

US 2014/0249664 A1    Sep. 4, 2014

Related U.S. Application Data

(63) Continuation of application No. PCT/JP2012/076087, filed on Oct. 9, 2012.

(30) Foreign Application Priority Data

Nov. 16, 2011    (JP) .................................. 2011-250592

(51) Int. Cl.
*G06F 19/00*    (2011.01)
*B23B 7/00*    (2006.01)
(Continued)

(52) U.S. Cl.
CPC ......... *G05B 19/19* (2013.01); *B23Q 17/2233* (2013.01)

(58) Field of Classification Search
CPC ................................ B23Q 15/18; B23Q 17/22
(Continued)

(56) References Cited

U.S. PATENT DOCUMENTS 6,615,697 B2   9/2003 Nakagawa
2002/0059851 A1   5/2002 Nakagawa
(Continued)

FOREIGN PATENT DOCUMENTS

JP    10-277889 A    10/1998
JP    2002-144191 A    5/2002
(Continued)

OTHER PUBLICATIONS

Official Communication issued in International Patent Application No. PCT/JP2012/076087, mailed on Nov. 6, 2012.
(Continued)

*Primary Examiner* — Mohammad Ali
*Assistant Examiner* — Md Azad (57) ABSTRACT

A machine tool includes a displacement measuring unit to measure the displacement of a workpiece center-to-blade tip distance which is the distance between a center equivalent position of a workpiece support surface of a workpiece support unit and a blade tip equivalent position of a tool support unit in a direction perpendicular or substantially perpendicular to a spindle axis. The displacement measuring unit measures the displacement by measuring the displacement of a continuous path between the center equivalent position of the workpiece support unit and the blade tip equivalent position and excluding a processing movement region. The displacement measuring unit includes workpiece side and tool side linear position detecting units. A measured value of the displacement measuring unit is used in correcting an X-axis command value.

7 Claims, 5 Drawing Sheets

(51) Int. Cl.
*B23B 9/00* (2006.01)
*B23B 13/00* (2006.01)
*B23B 17/00* (2006.01)
*B23B 49/00* (2006.01)
*G05B 19/19* (2006.01)
*B23Q 17/22* (2006.01)

(58) Field of Classification Search
USPC .......................................................... 700/160
See application file for complete search history.

(56) References Cited

U.S. PATENT DOCUMENTS

| | | | | |
|---|---|---|---|---|
| 2002/0189120 | A1* | 12/2002 | Kaneda | G05B 19/042 33/636 |
| 2005/0022350 | A1* | 2/2005 | Tokuma | B23B 3/162 29/27 C |
| 2006/0254399 | A1* | 11/2006 | Inada | B23B 3/06 82/149 |
| 2007/0258781 | A1* | 11/2007 | Nishizaki | B23Q 17/2233 409/208 |
| 2013/0104707 | A1 | 5/2013 | Nakagawa | |

FOREIGN PATENT DOCUMENTS

| | | |
|---|---|---|
| JP | 2004-322255 A | 11/2004 |
| JP | 2006-212765 A | 8/2006 |
| JP | 2011-93068 A | 5/2011 |
| JP | 2011-093069 A | 5/2011 |
| JP | 2011-240423 A | 12/2011 |

OTHER PUBLICATIONS

English translation of Official Communication issued in corresponding International Application PCT/JP2012/076087, mailed on May 30, 2014.

Nakagawa, A. "Machine Tool"; U.S. Appl. No. 13/456,332, filed Apr. 26, 2012.

* cited by examiner

PRIOR ART

DISPLACEMENT AND POSITION MEASUREMENT IN MACHINE TOOL

CROSS REFERENCE TO THE RELATED APPLICATION

The present application is a continuation application, under 35 U.S.C §111(a) of international application No. PCT/JP2012/076087, filed Oct. 9, 2012, which claims priority to Japanese patent application No. 2011-250592, filed Nov. 16, 2011, the entire disclosures of which are herein incorporated by reference as a part of this application.

BACKGROUND OF THE INVENTION

1. Field of the Invention

The present invention relates to a machine tool such as, for example, a lathe, a machining center, a grinding machine, or a drilling machine and, more specifically, to correction of a thermal displacement occurring therein.

2. Description of the Related Art

In a machine tool such as, for example, a lathe, a closed loop control, which includes a feedback control system, has been utilized in controlling feeding a tool post or a head stock employed in a lathe of a spindle moving type. While a semi-closed loop system is generally utilized which makes use of a pulse coder that is accessory to a servo motor, a full closed loop system, which controls the position of, for example, a tool post by reading the position of the tool post by means of a linear position detecting unit such as, for example, a linear encoder, is often used where a highly accurate positioning is required.

Also, the machine tool is susceptible to the thermal expansion and/or the thermal deformation occurring in a bed or any other site because of cutting heat and/or heat emission at various sites thereof as a result of the machine operation. The thermal expansion and/or the thermal deformation lead to a reduction in processing accuracy. Accordingly, some of the machine tools make use of a cooling device to minimize the thermal expansion and deformation. However, where the thermal expansion is desired to be sufficiently suppressed, the cooling device tends to become bulky or mere cooling is unable to secure a sufficient processing accuracy.

In view of the foregoing inconveniences, various suggestions have been made to measure the temperature to enable the thermal displacement occurring in the machine as a whole to be estimated so that a thermal displacement correction such as, for example, a correction of the cutting quantity (cutting depth) of a cutting tool can be implemented. It has however been found that where the displacement is estimated from the temperature detected, a complicated calculation such as, for example, a time delay is required at the stage at which the displacement is calculated from the temperature. Considering that change in temperature originates from various factors, it is indeed difficult to implement the thermal displacement correction precisely from the measurement of the temperature. Because of it, measurement of the actually occurring thermal displacement with the use of, for example, a linear scale has been suggested to perform the correction.

Figure 8:
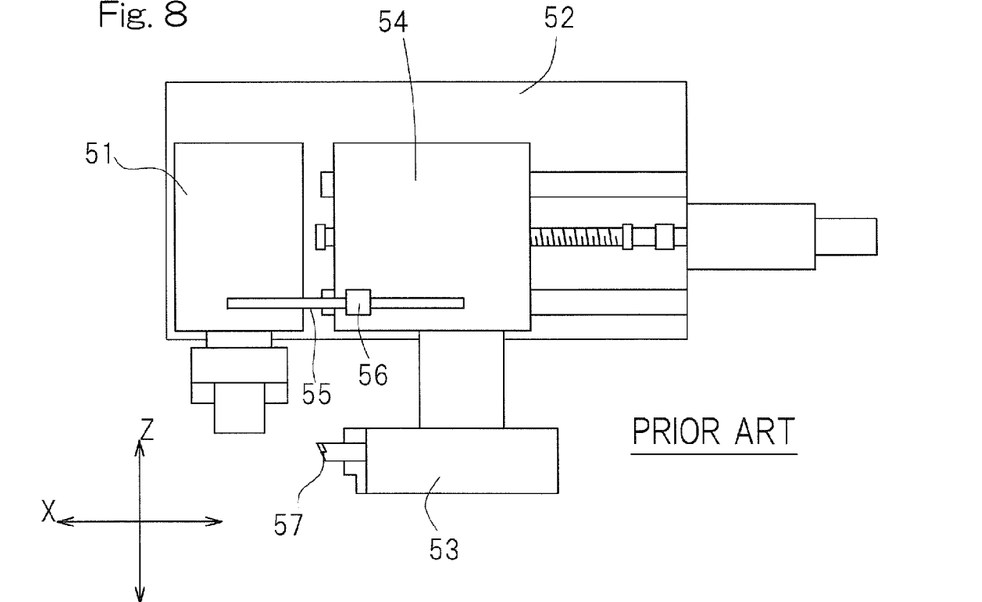
FIG. 8 is a top plan view of the machine tool main body of the prior art machine tool.

By way of example, the machine tool disclosed in, for example, the JP Laid-open Patent Publication No. 2002-144191 is a lathe which is so configured and so structured that, as shown in FIG. 8 of the accompanying drawings, a head stock 51 is fixedly positioned on a bed 52 and a feed slide 54 having a tool post 53 mounted thereon is movable in a direction radially of a spindle (X-axis direction). In this prior art lathe, a scale 55 fitted to the head stock 51 so as to extend in the direction radially of the spindle is read by a reading member 56, fitted to a feed slide 54, to thereby measure the position of the tool post 53 in the direction radially of the spindle. The measurement of the position of the tool post 53 in the direction radially of the spindle changes with, for example, the thermal deformation. Accordingly, in this prior art lathe, the proper processing accuracy is secured at all times by correcting, for example, the cutting quantity of a tool 57 according to the measurement.

Measurement of only the relative position between the head stock 51 and the feed slide 54 such as disclosed in JP Laid-open Patent Publication No. 2002-144191 referred to above results in an error in the distance between a spindle axis and the tool in the event of occurrence of the thermal displacement of the tool post 53 relative to the feed slide 54.

According to the conventional control of the full closed loop system, for example, the lathe of a tool post moving type is controlled by directly reading the movement of the tool post by means of the linear position measuring instrument such as, for example, a linear encoder. It has however been found that, in the event of the thermal displacement occurring at a site at which the linear position measuring instrument is fitted, the control is no longer accomplished with a high accuracy. As a result, the conventional control of the full closed loop system requires the lathe to be equipped with extra instruments for performing a thermal displacement correction.

Also, since the processing dimension of a workpiece is determined by the distance between a workpiece center and a blade tip of the tool, a direct detection of this distance if possible makes it possible to accomplish the processing with a high accuracy. It has however been found that the direct measurement of the distance between the workpiece center and the blade tip of the tool requires a measuring instrument to interfere with the workpiece and/or the tool and, therefore, the direct measurement of such distance has not yet been realized.

SUMMARY OF THE INVENTION

In view of the foregoing inconveniences, preferred embodiments of the present invention provide a machine tool in which displacement between the workpiece center and the blade tip of the tool is measured in a manner as close as possible to that in which such displacement is directly measured.

A machine tool according to a preferred embodiment of the present invention includes a stationary bed; a workpiece support unit configured to support a workpiece; a tool support unit configured to support a tool, the workpiece support unit and the tool support unit being mounted on the stationary bed and configured to selectively advance and retract relative to each other in a direction parallel or substantially parallel to a cutting direction; and a drive mechanism configured to selectively advance and retract the workpiece support unit and the tool support unit relative to each other. The machine tool described above includes a displacement measuring unit configured to measure a displacement of a workpiece center-to-blade tip distance, which is a distance in the cutting direction between a center equivalent position of the workpiece support unit and a blade tip equivalent position of the tool support unit. The displacement measuring unit is provided on a continuous path between the center equivalent position of the workpiece support unit and the blade tip equivalent position, which path avoids a processing movement region in which the workpiece and the tool undergo a relative movement and measures the displacement of the workpiece center-to-blade tip distance by measuring the displacement of the continuous path.

It is to be noted that the wording "center equivalent position of the workpiece support unit" should be understood as meaning the position that can be regarded as the center of the workpiece support unit in a measuring direction of the displacement and may be separated in a direction perpendicular or substantially perpendicular to the measuring direction of the displacement. However, the center equivalent position of the workpiece support unit lies at the center of the workpiece support unit in the measuring direction of the displacement and on the workpiece support unit, or lies on a member movable together with the workpiece support unit. Also, the wording "blade tip equivalent position" should be understood as meaning the position proximate to the position of the blade tip, which position can be equally dealt with measurement of the blade tip position as far as the influence brought about by the thermal displacement is concerned, although the blade tip equivalent position may have a somewhat different position in the measuring direction of the displacement.

According to the configuration described above, the displacement measuring unit is disposed on the continuous path between the center equivalent position of the workpiece support unit and the blade tip equivalent position and measures the displacement of the continuous path. Because of that, although the measurement takes place on the detoured path, the measurement equivalent to the direct measurement of the displacement between the workpiece center and the blade tip of the tool is performed substantially with due regard paid to the limit imposed on the control of the machine tool. Since the displacement between the workpiece center and the blade tip of the tool in the direction perpendicular or substantially perpendicular to the spindle axis is measured in a manner similar to the direct measurement, the processing accuracy in the cutting direction is significantly increased.

Also, the continuous path, on which the displacement referred to above is measured, is a path separate from the processing movement region, in which the workpiece and the tool are driven relative to each other by the relative moment of the workpiece support unit and the tool support unit is excluded and, therefore, the displacement measuring unit avoids undesirable interference with the workpiece and/or the tool.

The position control of the drive mechanism effected by the control device with the utilization of the displacement measuring unit performs a correction of, for example, the amount of movement or the position of origin with the use of the measurement of the displacement measuring unit. When such correction is performed, the measurement of the displacement by the displacement measuring unit is utilized, and therefore, the accurate correction with a simple calculation is sufficient, unlike a thermal displacement correction from a temperature measured value. It is to be noted that where the displacement measuring unit is of a type capable of implementing the measurement over a somewhat long distance to detect the position, the measured value of the displacement measuring unit may be used for a feedback control without relying on the correction calculation.

In a preferred embodiment of the present invention, the displacement measuring unit may include a reference frame, which is made of a thermal expansion material having a lower coefficient of thermal expansion than that of the stationary bed and is disposed on the stationary bed having been positioned on the continuous path; and a linear position detecting unit including a scale extending in a direction parallel or substantially parallel to the cutting direction and a readout head to read the scale, one of the scale and the readout head being provided in the reference frame. In other words, the configuration required to satisfy "on the continuous path between the center equivalent position of the workpiece support unit and the blade tip equivalent position excluding the processing movement region" is realized by the configuration "a reference frame disposed on the stationary bed having been positioned on the continuous path". It is to be noted that the linear position detecting unit referred to above is configured to detect a position in a linear direction. The coefficient of thermal expansion referred to above is synonymous with the coefficient of linear expansion.

The reference frame including the low thermal expansion member having a lower coefficient of thermal expansion than that of the stationary bed is disposed on the continuous path and the linear position detecting unit is disposed on this reference frame. Therefore, measurement of the displacement between a workpiece surface and the blade tip of the tool in a manner proximate to direct measurement is realized with a simplified structure. Where the linear position detecting unit includes the scale referred to above and the readout head configured to read the scale, positioning of the scale and the readout head in the manner described above is effective to permit the drive control of the relative position between the workpiece support unit and the tool support unit to be implemented without a thermal displacement correcting unit operable based on the temperature measured value with high accuracy regardless of the thermal displacement and, hence, such effects that the control system is simplified and the processing accuracy is increased are obtained. Also, using the linear position detecting unit used generally in the machine tool, the above described various effects are obtained.

Where the reference frame is used, the reference frame may include an axial frame body, which extends in a direction along a center axis of the workpiece support unit; and a transverse frame body extending in a direction perpendicular or substantially perpendicular to the center axis, in which case, as the linear position detecting unit. The machine tool also includes a workpiece side linear position detecting unit configured to measure the displacement between the center equivalent position of the workpiece support unit and the reference frame; and a tool side linear position detecting unit configured to measure a displacement between the blade tip position and the reference frame.

In this case, a specific structure that enable the displacement between the workpiece center and the blade tip of the tool to be measured in a manner proximate to the direct measurement is realized. In other words, the workpiece side linear position detecting unit and the tool side linear position detecting unit are preferably provided and both of the displacement of the center equivalent position of the workpiece support unit and the displacement of the blade tip equivalent position are measured and used in control. Therefore, the distance between the workpiece, supported by the workpiece support unit, and the blade tip of the tool disposed in the tool support unit are accurately detected.

Also, the workpiece side linear position detecting unit and the tool side linear position detecting unit are disposed on a detecting unit support frame, made of the low thermal expansion material disposed on the stationary bed, and, yet, on the common detecting unit support frame. Therefore, the distance between the workpiece and the tool blade tip is accurately detected from the detection value of the workpiece side linear position detecting unit and the detection value of the tool side linear position detecting unit regardless of the thermal displacement occurring in one or both of the stationary bed and the driving mechanism. In other words, preferably, the workpiece position and the tool position during the movement and after the thermal deformation are detected by the detecting unit support frame and the linear position detecting units, which do not undergo the thermal deformation. As a result, the distance between the workpiece and the tool blade tip is detected accurately. For this reason, the use of the control device configured and programmed to control the drive mechanism with the utilization of both of the detection values of the workpiece side linear position detecting unit and the tool side linear position detecting unit makes it possible to accomplish the processing accurately without effecting any complicated thermal displacement correction by the temperature measurement and, hence, the control system is, too, simplified.

The structure in which the workpiece side linear position detecting unit and the tool side linear position detecting unit is described below and preferably depends on the form of the various relative movements between the workpiece support unit and the tool support unit both included in the machine tool.

For example, in the machine tool of the spindle moving type, the tool support unit is fixedly disposed on the stationary bed and the workpiece support unit is provided on a feed slide, movable on the stationary bed in the direction perpendicular or substantially perpendicular to the axis, for movement in the direction parallel or substantially parallel to the axis; the workpiece side linear position detecting unit is configured such that one of the scale and the readout head is provided in the transverse frame body of the reference frame and the other of the scale and the readout head is provided on the feed slide; and the tool side linear position detecting unit is configured such that one of the scale and the readout head is provided in the axial frame body of the reference frame and the other of the scale and the readout head is provided in the tool support unit. In the case of this configuration, in the machine tool of the spindle moving type, the displacement between the workpiece surface and the blade tip of the tool is measured as close as possible to the direct measurement and the processing accuracy is therefore increased.

In another example, the workpiece support unit is fixedly positioned on the stationary bed and the tool support unit is disposed on a feed slide, which is movable on the stationary bed in the direction perpendicular or substantially perpendicular to the axis, for movement in the direction parallel or substantially parallel to the axis; the workpiece side linear position detecting unit is configured such that one of the scale and the readout head is provided in the transverse frame body of the reference frame and the other of the scale and the readout head is provided in the workpiece support unit; and the tool side linear position detecting unit is configured such that one of the scale and the readout head is provided in the axial frame body of the reference frame and the other of the scale and the readout head is provided in the tool support unit. In the case of this configuration, in the machine tool of the tool moving type, the displacement between the workpiece center and the blade tip of the tool is measured as close as possible to the direct measurement and the processing accuracy is therefore increased.

In yet another example, the workpiece support unit is disposed on the stationary bed for movement in the direction perpendicular or substantially perpendicular to the axis and the tool support unit is disposed on the stationary bed for movement in the direction parallel or substantially parallel to the axis; the workpiece side linear position detecting unit is configured such that one of the scale and the readout head is provided in the transverse frame body of the reference frame and the other of the scale and the readout head is provided in the workpiece support unit; and the tool side linear position detecting unit is configured such that one of the scale and the readout head is provided in the axial frame body of the reference frame and the other of the scale and the readout head is provided in the tool support unit. In the case of this configuration, in the machine tool of a spindle and tool moving type in which the spindle moves in the direction parallel or substantially parallel to the spindle axis, the displacement between the workpiece center and the blade tip of the tool is measured as close as possible to the direct measurement and the processing accuracy is therefore increased.

In an additional example, the workpiece support unit is movably disposed on the stationary bed for movement in the direction parallel or substantially parallel to the axis and the tool support unit is disposed on the stationary bed for movement in the direction perpendicular or substantially perpendicular to the axis; the workpiece side linear position detecting unit is configured such that one of the scale and the readout head is provided in the transverse frame body of the reference frame and the other of the scale and the readout head is provided in the workpiece support unit; and the tool side linear position detecting unit is configured such that one of the scale and the readout head is provided in the reference frame and the other of the scale and the readout head is provided in the tool support unit. In the case of this configuration, in the machine tool of the spindle and tool moving type in which the spindle moves in the direction parallel or substantially parallel to the spindle axis, the displacement between the workpiece center and the blade tip of the tool is measured as close as possible to the direct measurement and the processing accuracy is therefore increased.

In another preferred embodiment of the present invention, the machine tool of the type referred to above may also include a control device configured and programmed to control the drive mechanism. This control device may in turn include an X-axis drive control unit configured and programmed to control a motor to selectively advance and retract the workpiece support unit and the tool support unit relative to each other in the direction perpendicular or substantially perpendicular to the axis; a calculation control unit configured and programmed to apply a command value to the X-axis drive control unit in response to a command value of a drive command of a processing program; and a correcting unit provided in the calculation control unit to correct the command value to be applied to the X-axis drive control unit in dependence on a measured value of the displacement of the displacement measuring unit. In the case of this configuration, since the measured value of the displacement measuring unit is used for correction, the displacement measuring unit having a small length is used satisfactorily and, therefore, the displacement measuring unit which is inexpensive, but has a high accuracy, is provided.

Any combination of at least two configurations of various preferred embodiments of the present invention is included within the scope of the present invention. In particular, any combination of two or more of the appended claims is also within the scope of the present invention.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

A first preferred embodiment of the present invention will now be described in detail with particular reference to FIGS. 1A and 1B to FIG. 4. The illustrated machine tool is a numerically controlled machine tool and includes a machine tool main body 1, which is a mechanical portion, and a control device 2 configured and programmed to control the machine tool main body 1. The machine tool main body 1 preferably is a lathe or turning machine of a spindle moving type and is so designed that a spindle 6 is rotatably supported by a head stock 5 installed on a machine bed 3, which is a stationary bed, through a feed slide 4 and a tool post 7 is installed on the machine bed 3 through a support carrier 26. The support carrier 26 is fixedly mounted on the machine bed 3. The tool post 7 is in the form of a turret that is mounted on the support carrier 26 for indexed rotation. The spindle 6 and the head stock 5 cooperate with each other to define a workpiece support unit 21 and, on the other hand, the tool post 7 and the support carrier 26 cooperate with each other to define a tool support unit 22.

The feed slide 4 is mounted for movement on an X-axis guide 9, provided in the machine bed 3, in a horizontal direction (X-axis direction) radially of the spindle at right angles to a shaft axis O of the spindle 6, and is driven selectively advanced and retracted in leftwards and rightwards directions by an X-axis drive mechanism 12 that preferably includes a servo motor 10, mounted on the machine bed 3, and a feed screw mechanism 11 configured to translate a rotary output of such servomotor 10 into a linear movement. The feed screw mechanism 11 includes a screw shaft and a nut. As shown in FIG. 2, the head stock 5 is mounted on a Z-axis guide 13 which is provided on the feed slide 4 for movement in a direction (Z-axis direction) parallel or substantially parallel to a spindle axial direction and is driven selectively advanced and retracted in forward and rearward directions by an Z-axis drive mechanism 16 that includes a servomotor 14, mounted on the feed slide 4, and a feed screw mechanism 15 (best shown in FIG. 1A) configured to translate a rotary output of such servo motor 14 into a linear movement. The feed screw mechanism 15 referred to above includes a screw shaft and a nut. A rotary motion of the spindle 6 is carried out by a spindle motor (not shown) built in the head stock 5. The spindle 6 includes a free end to which a chuck 17 is detachably fitted. The chuck 17 is capable of gripping a workpiece W via a plurality of chuck pawls 17a that are movable in a direction radially of the chuck 17.

Figure 1A:
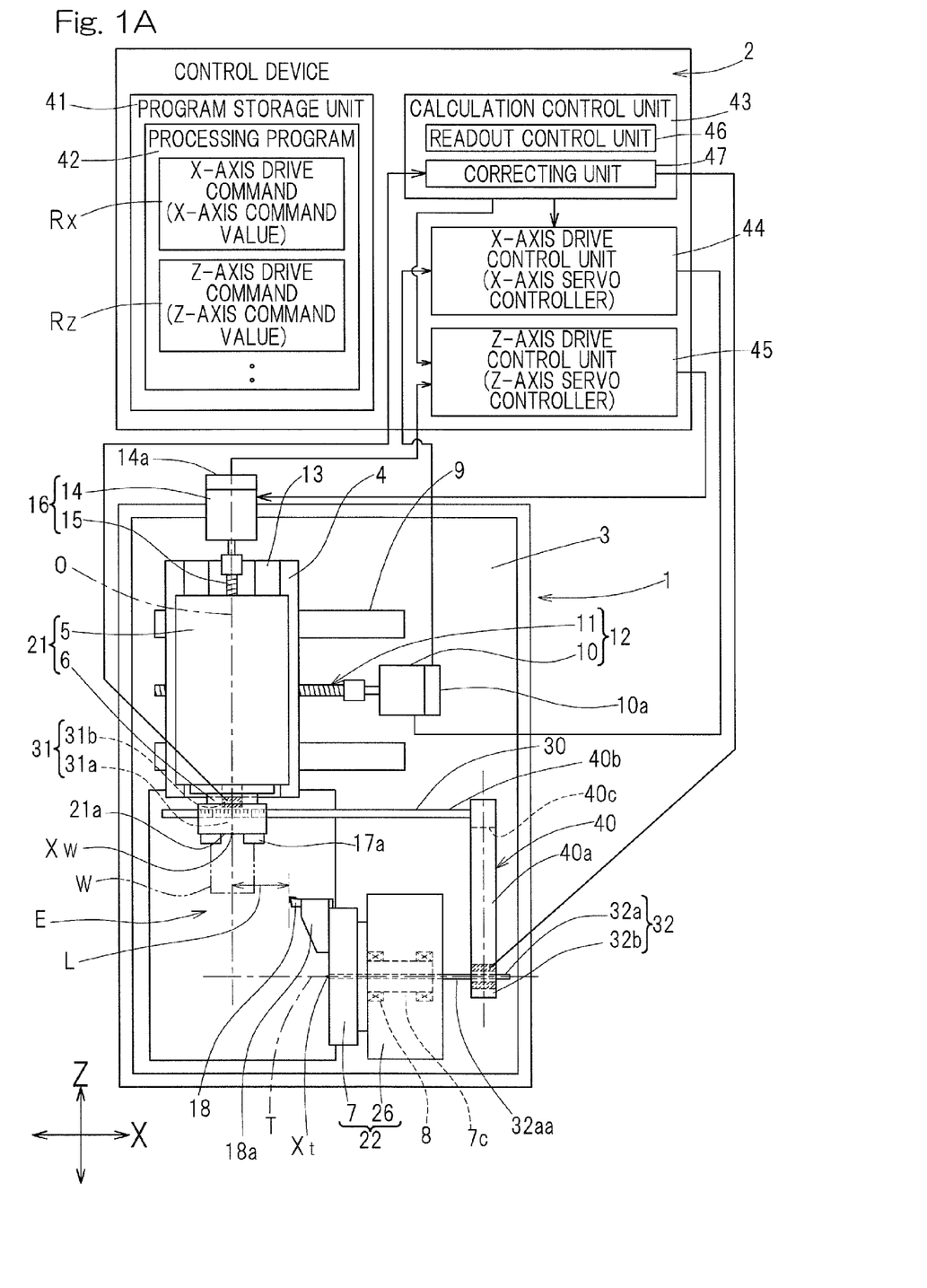
FIG. 1A is an explanatory diagram illustrating a combination of a top plan view, showing a machine tool main body of a machine tool designed in accordance with a first preferred embodiment of the present invention, and a block diagram showing a conceptual configuration of a control device of the machine tool.
Figure 2:
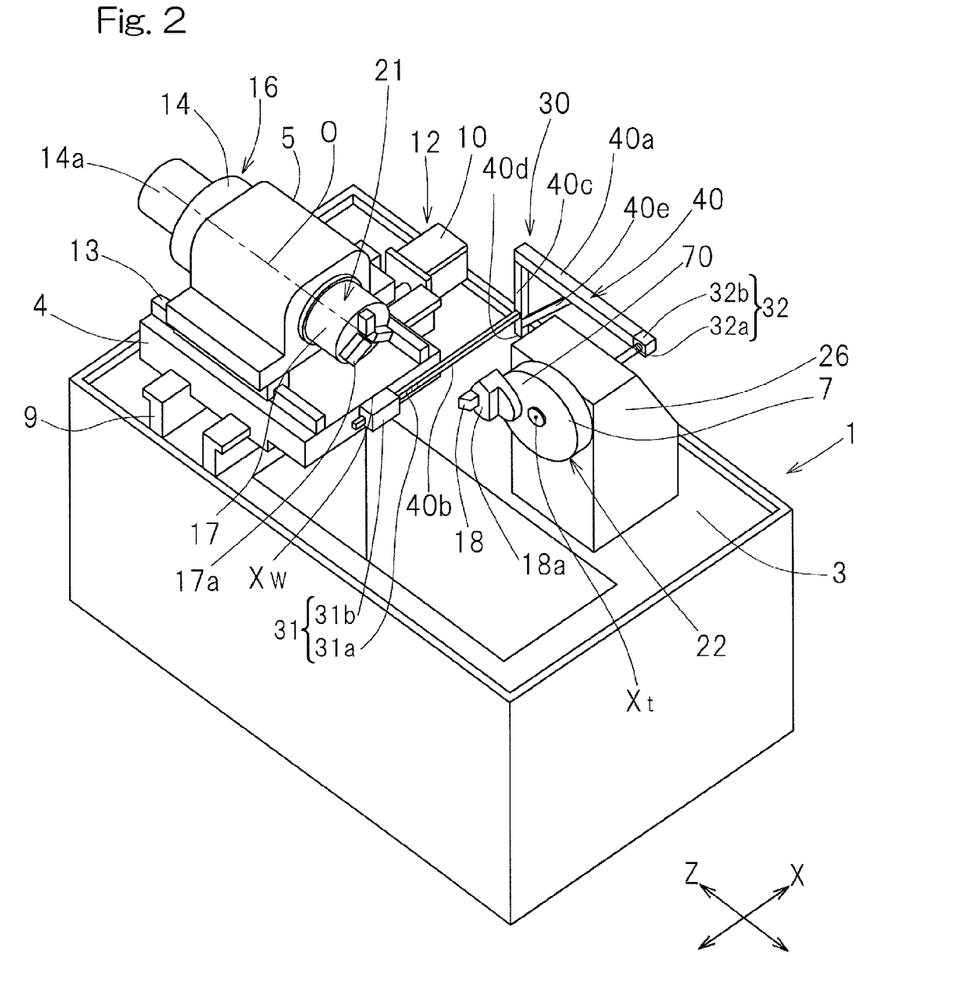
FIG. 2 is a perspective view of the machine tool main body.
Figure 3:
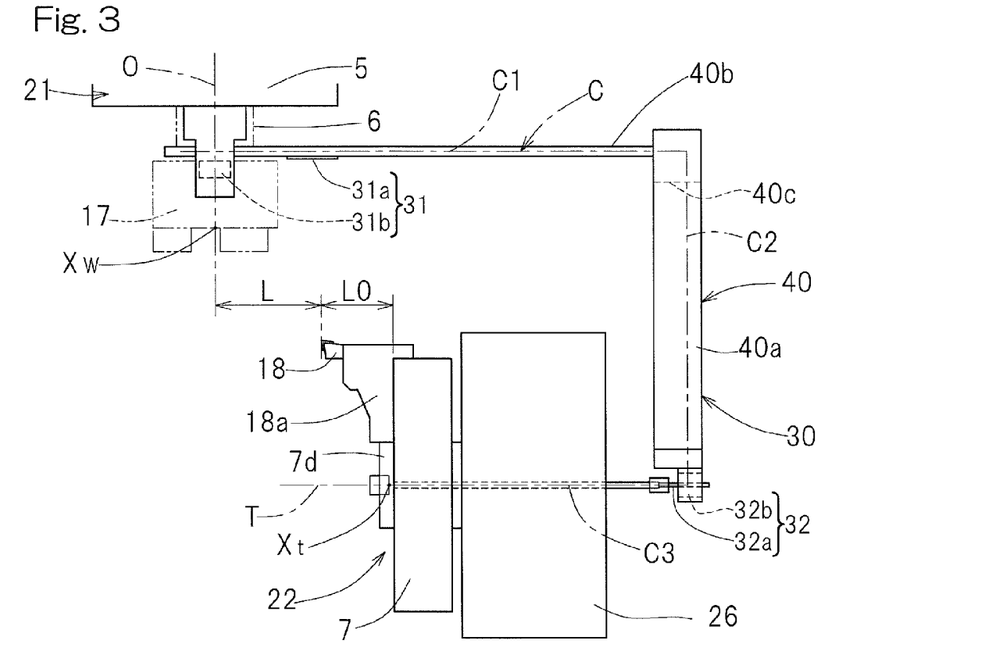
FIG. 3 is a fragmentary enlarged top plan view showing a displacement measuring unit included in the machine tool.

The tool post 7 shown in FIG. 1A is rotatable relative to the support carrier 26 about a horizontal rotational center axis T extending in a direction parallel or substantially parallel to the X-axis direction and has its outer peripheral portion provided with a plurality of tool mounts (not shown) that are arranged in a row extending in a circumferential direction of the tool post 7. The rotational center axis T is in coincidence with a center axis of the tool post 7. Those tool mounts referred to above are used to support respective tools 18 such as, for example, a turning tool and/or a rotary tool fitted replaceably thereto. This tool post 7 is fixed to a one end of a hollow shaft 7c that is rotatably supported by the support carrier 26 through bearings 8, and, when the hollow shaft 7c is rotated by an indexing motor (not shown), the tool mounts are indexed one at a time to a working position where the arbitrarily chosen one of the tool mounts confronts the spindle 6. It is to be noted that the tool post 7 may have a front elevational shape that is round, as shown in FIG. 2, or polygonal. It is also to be noted that in FIG. 1A and FIG. 2, only one tool 18 is shown as fitted to the corresponding tool mount and the remaining tools fitted to the corresponding tool mounts are neither shown nor described for the sake of brevity.

Referring particularly to FIG. 1A, the machine tool according to this first preferred embodiment includes a displacement measuring unit 30 provided in the tool machine main body 1 which is the previously described basic structure. The displacement measuring unit 30 measures a displacement ΔL (not shown) of a workpiece center-to-blade tip distance L, which is a distance between a position Xw equivalent to a center of the workpiece support unit 21 and a position Xt equivalent to a blade tip in the tool support unit 22 in a direction (X-axis direction) perpendicular or substantially perpendicular to the spindle axis O. The workpiece support unit 21 includes a workpiece support surface 21a, which defines a workpiece seating surface for the chuck 17 mounted on the spindle 6 in the instance as shown. In the illustrated example, the workpiece support surface 21a has a geometric center which defines the center in a displacement measuring direction (in the X-axis direction in this instance) of the workpiece support unit 21.

The center equivalent position Xw of the workpiece support unit 21 as specifically referred to above is the position that can be regarded as the center of the workpiece support unit 21 in a displacement measuring direction (the X-axis direction in this instance) and may be spaced from a vertical direction or a forward and rearward direction, which is a direction perpendicular or substantially perpendicular to the displacement measuring direction. This center equivalent position Xw of the workpiece support unit 21 lies at the center of the workpiece support unit 21 in the displacement measuring direction (the X-axis direction) and is situated on the workpiece support unit 21 or on a member movable together with the workpiece support unit 21 in the perpendicular or substantially perpendicular direction (the X-axis direction). In the illustrated preferred embodiment, the position Xw equivalent to the center of the workpiece support unit 21 is situated at the same X-axis direction position on a front surface of the feed slide 4 (a surface of the feed slide 4 on a side of the tool post 7 in the Z-axis direction) as the spindle axis O.

On the other hand, the blade tip equivalent position Xt referred to above may be somewhat different in position in the displacement measuring direction, but is situated at a position which is proximate to the position of the blade tip of the tool 18 and which is handled equivalently to the measurement of the blade tip position with respect to the influence brought about by a thermal displacement. In the illustrated preferred embodiment, the blade tip equivalent position Xt is situated at a front surface (surface on a side adjacent the tool post 7 in the X-axis direction) position. The distance L0 (shown in FIG. 3) in the X-axis direction between the blade tip equivalent position Xt and the actual position of the blade tip is calculated as, for example, a fixed value.

Figure 1B:
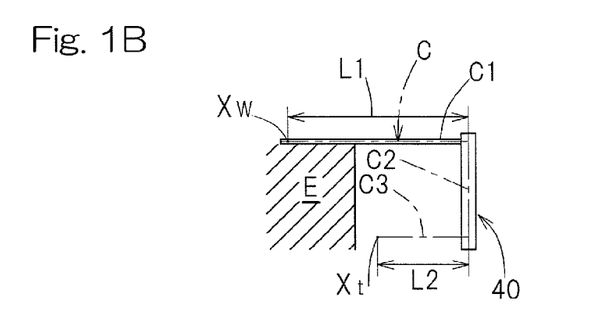
FIG. 1B is an explanatory diagram showing a portion of FIG. 1A.
Figure 4:
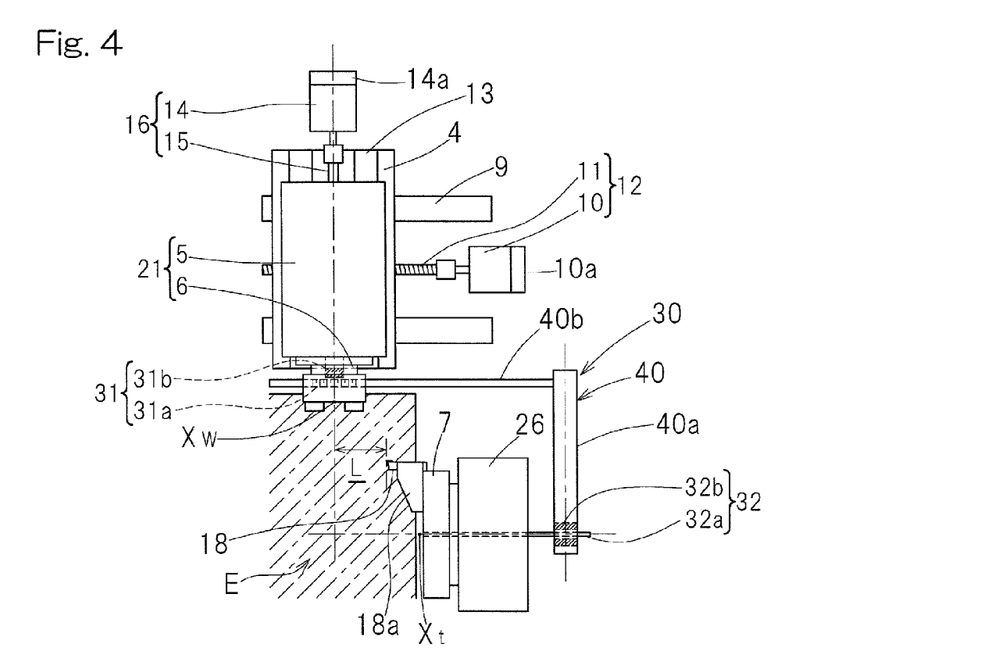
FIG. 4 is a top plan view of the machine tool main body of the machine tool.

A region E (processing movement region) shown by the hatching in FIG. 1B and FIG. 4 is a region where the workpiece W and the tool 18 are moved relative to each other by the relative movement of the workpiece support unit 21 and the tool support unit 22 for processing. The displacement measuring unit 30 referred to previously is provided on a path C that continuously extends between the center equivalent position Xw of the workpiece support unit 21 and the blade tip equivalent position Xt and is configured to measure the displacement ΔL of the workpiece center-to-blade tip distance L by measuring the displacement of the continuous path C. The path C, when viewed in a plane or from top, extends along and above a reference frame 40, as will be described later, and includes path sections C1 to C3. The displacement measuring unit 30 includes the reference frame 40, which is made of a low thermal expansion member, and linear position detecting units 31 and 32 provided in the reference frame 40 on a workpiece side (the perpendicular or substantially perpendicular direction) and a tool side (the axial direction).

The reference frame 40 is made of a low thermal expansion material such as, for example, an alloyed material such as, for example, Invar (also referred to invariable steel), particularly an alloyed material such as, for example, Super Invar or a stainless Invar, which material has a lower coefficient of thermal expansion than that of the machine bed 3. The material for this reference frame 40 may not necessarily be limited to the Invar, but may be any alloyed material of a kind having a coefficient of thermal expansion equal to or lower than that of the Invar, or any ceramic material.

The reference frame 40 referred to above is fixed to the machine bed 3, which is a stationary bed, at a single mount joint defining a portion of the reference frame 40. More specifically, the reference frame 40 includes a single support post 40c fixed at a lower end thereof to an upper surface of the machine bed 3, which lower end of the support post 40c defines the mount joint referred to above. It is to be noted that the term "single mount joint" referred to above may include a certain region or branched two portions and is intended to mean that the reference frame 40 as a whole is fixed, not at a plurality of joints such as defined by its opposite ends, but is fixed at such one location that the reference frame 40 can be conceptually regarded as fixed in a single point support. Also, although the joint by which the reference frame 40 is fixed to the machine bed 3 is preferably single, the reference frame 40 may be supported at any other joint, for example, via a slide structure that will not hamper a thermal expansion and contraction of the bed 3 relative to the reference frame 40.

The reference frame 40 includes a axial frame body 40a, extending in a direction parallel or substantially parallel to the spindle axis O, and a transverse frame body 40b extending in a direction perpendicular or substantially perpendicular to the spindle axis O and represents an L-shape when viewed in a plane or from top. The axial frame body 40a and the transverse frame body 40b are preferably supported by and from the support post 40c in a cantilever fashion. The axial frame body 40a is positioned on a back surface (rear surface) side of the support carrier 26 at a level flush with the level at which the center of rotation of the tool post 7 in the form of the turret is located. On the other hand, the transverse frame body 40b is disposed at a level flush with the height of the feed slide 4 and near to a front surface of the feed slide 4. A Z-axis direction intermediate portion of the axial frame body 40a and a lower end of the support post 40c are connected with each other preferably via a brace member 40e. The reference frame 40 as a whole is preferably made of the low thermal expansion material as discussed above.

Each of the workpiece side and tool side linear position detecting units 31 and 32 referred to above includes a first or second scale 31a or 32a, extending in a direction (X-axis direction) perpendicular or substantially perpendicular to the spindle axis O, and a first or second readout head 31b or 32b configured to read the associated scale 31a or 32a. Each of the first and second scales 31a and 32a includes detectable calibrations provided therein. Each of the workpiece side and tool side linear position detecting units 31 and 32 may be either an optical detecting unit or a magnetic detecting unit, but in the illustrated preferred embodiment the optical detecting unit is preferably used.

The workpiece side linear position detecting unit 31 is of a structure in which the first scale 31a is provided in the transverse frame body 40b and the associated first readout head 31b is disposed at the center equivalent position Xw of the workpiece support surface 21a at a front surface of the feed slide 4. The first scale 31a may be either a type having the calibrations dispensed directly on the transverse frame body 40b or of a type in which a calibration forming member having the calibrations provided therein is pasted to the transverse frame body 40b. Where the calibration forming member is utilized, the coefficient of thermal expansion thereof is rendered to be a material comparable with that of the reference frame 40. The first scale 31a has a length that permits the displacement to be measured during the measurement of the displacement ΔL of the workpiece center-to-blade tip distance L resulting from, for example, the thermal displacement and, accordingly, the length thereof may be small. Where the site at which the displacement ΔL is implemented is a plurality of locations in a spindle crossing direction (the X-axis direction) perpendicular or substantially perpendicular to the spindle axis O, the length of the first scale 31a is rendered to be a length across those locations, or something short enough to allow the displacement ΔL to be measurable is provided distributed over those locations.

It is to be noted that since the first scale 31a having a small length as described hereinabove is satisfactory, the first scale 31a may be provided on the feed slide 4, in which case the first readout head 31b is provided on the transverse frame body 40b. In addition, although the first scale 31a may be a type provided over the entire region of movement of the feed slide 4, in which case the position control in the X-axis direction is implemented by the full closed control, the workpiece side linear position detecting unit 31 that can precisely measure a long distance is difficult to obtain and, therefore, in terms of the cost and the accuracy, the first scale 31a is preferably of a small length and capable of measuring the displacement ΔL.

The tool side linear position detecting unit 32 is of a structure in which the second scale 32a is provided in the tool support unit 22 and the associated second readout head 32b is provided in the axial frame body 40a of the reference frame 40. The tool side linear position detecting unit 32 may also be either an optical type or a magnetic type, but in the preferred embodiment now under discussion an optical position sensor is preferably used.

The tool side linear position detecting unit 32 is preferably configured as follows. The second scale 32a is provided in a tip end portion of a shaft member 32aa fixed to the tool post 7. The shaft member 32aa is inserted in a hollow shaft 7c of the tool post 7 with its base end fixed to a front plate member 7d (best shown in FIG. 3) of a rotatable portion of the tool post 7 in coaxial relation with the rotation center axis T while the tip end portion thereof protrudes outwardly from the hollow shaft 7c. The second scale 32a is provided in this tip end portion then protruding outwardly from the hollow shaft 7c. The shaft member 32aa is made of a material having a coefficient of thermal expansion which is the same as or about equal to that of the reference frame 40, and is, except for a fixed portion at the base end thereof, non-constrained relative to the tool support unit 22 in the axial direction. The second scale 32a is provided with the calibrations in a portion of the circumference thereof or in the entire circumference thereof. The associated second readout head 32b is, in the instance as shown, provided with a through-hole into which the shaft member 32aa is inserted, but may be provided so as to confront a face of a portion of the shaft member 32aa.

Referring to FIG. 1A, the control system will be described. The control device 2 referred to previously preferably includes a computer controlled numerical control device and a programmable controller and is of a structure in which a processing program 42 stored in a program storage unit 41 is executed by a calculation control unit 43, which is comprised of, for example, a central processing unit (CPU), to thus control various elements and portions of the machine tool main body 1. The control device 2 includes, in addition to the calculation control unit 43, an X-axis drive control unit 44, a Z-axis drive control unit 45 and a sequence control unit (not shown). The processing program 42 has an X-axis drive command Rx, a Z-axis drive command Rz and a sequence control command (not shown) of the various elements, all of which are described in, for example, NC codes, and the calculation control unit 43 reads out each of those commands in the sequence in which they are described. The sequence control command so read out is transferred to the sequence control unit and the control is executed by this sequence control unit.

The calculation control unit 43 applies the X-axis drive command Rx in the processing program 42 to the X-axis drive control unit 44 as a position command of the X-axis and also applies the Z-axis drive command Rz to the Z-axis drive control unit 45 as a position command of the Z-axis. Where a correcting unit 47 as will be described later is desired to function, a position command after the correction is applied.

The X-axis drive control unit 44 and the Z-axis drive control unit 45 include X-axis and Z-axis servo controllers, respectively and control the X-axis servo motor 10 and the Z-axis servo motor 14 so that they assume command positions of the X-axis and Z-axis given by the calculation control unit 43. At this time, the X-axis and Z-axis drive control units 44 and 45 make use of position detection values of respective position detectors 10a and 14a, each comprised of a pulse coder or an encoder that is accessory to each of the X-axis servo motor 10 and the Z-axis servo motor 14, to execute a feedback control due to be a semi-closed loop control.

The calculation control unit 43 is provided with a readout control unit 46 and the correcting unit 47. The calculation control unit 46 is disposed at a predetermined detecting position, at which a position to be detected by the position detector 10a of the X-axis servo motor 10 is located, and is configured to read out respective detection values of the first and second readout heads 31b and 32b of the workpiece side and tool side linear position detecting units 31 and 32 at a timing determined as a detecting time. It is to be noted that the "predetermined detecting position" referred to above and hereinafter may be arbitrarily defined in the readout control unit 46, but is an arbitrarily defined position at a position, at which the workpiece W supported by the chuck 17 of the spindle 6 is processed by the tool 18, within a region in which the tool 18 is positioned relative to the spindle 6.

More specifically, the distance L in the X-axis direction between the spindle axis O of the spindle 6 and the position of the blade tip of the tool 18 is the arbitrarily defined position within the radius of the workpiece W supported by the chuck 17 of the spindle 6 or the radius which is the sum of the radius of the workpiece W supported by the chuck 17 and an arbitrarily chosen marginal distance. It may be a position which defines a processing finish radius of a peripheral surface of a workpiece W to be processed. This arbitrary defined position may be either a fixed value or a value that is changed by an operation from, for example, the processing program 42 or an operating panel.

The "timing determined as a detecting time" referred to above may be arbitrarily defined according to, for example, the processing program 42, but is a timing, for example, immediately preceding the processing of the workpiece W or a time span between the finish of processing of one workpiece W and the start of processing of the subsequent workpiece W. When the readout is carried out while the workpiece W continues to be supported by the spindle 6, so that the tool 18 may not interfere with the workpiece W, the tool 18 and the workpiece W are separated from each other in the Z-axis direction, or the tool 18 although not yet contacting the workpiece W is held at a position proximate to the workpiece W, that is, within the range of the above described "arbitrarily chosen marginal distance".

The correcting unit 47 referred to above performs a process of correcting the X-axis command value, given by the X-axis drive command of the processing program 41, with the displacement ΔL detected by the workpiece side and tool side linear position detecting units 31 and 32, and then applying such a corrected value to the X-axis drive control unit 44. The amount of correction may be such that the displacement ΔL detected, that is, the sum ΔL (=ΔL1+ΔL2) of the displacements ΔL1 and ΔL2, which has been detected respectively by the workpiece side and tool side linear position detecting units 31 and 32, itself may be corrected as an offset value, or the value obtained by multiplying the detected displacement ΔL by a predetermined coefficient may be corrected as an offset value. Also, in dependence on the difference between the distance (detected by the position detector 10a of the X-axis servo motor 10) between the spindle axis O and the blade tip position, which is exhibited when the displacement detection is carried out by the workpiece side and tool side linear position detecting units 31 and 32, and the radius of the processing surface of the workpiece W, the detected displacement ΔL may be multiplied by a coefficient to provide the amount of correction. It is to be noted that the displacement measured by each of the workpiece side and tool side linear position detecting units 31 and 32 is set to zero (0) when, for example, the machine tool is held at normal temperature (for example, about 20° C.).

An example of the processing method implemented by the machine tool of the structure hereinabove described will now be described. Where a plurality of workpieces W are sequentially subjected to a cutting process, during a period in which one workpiece W is loaded out from the chuck 17 of the spindle 6 and the next adjacent workpiece W is loaded in, the tool post 7 is driven relative to the spindle 6 to the predetermined detecting position referred to previously (although in the illustrated instance, the spindle 6 is driven relative to the tool post 7) to cause the workpiece side and tool side linear position detecting units 31 and 32 to measure the displacement ΔL. Alternatively, while in a condition in which the workpiece W ready to be processed is held by the chuck 17 of the spindle 6, measurement of the displacement ΔL is carried out. With reference to the measured displacement ΔL, the X-axis command value of the X-axis drive command Rx of the processing program 41 is corrected by the correcting unit 47, followed by control of the cutting in the X-axis direction.

According to the machine tool of the structure described above, the workpiece side and tool side linear position detecting units 31 and 32 which will be the displacement measuring unit 30 are situated on the continuous path C between the center equivalent position Xw of the workpiece support unit 21 and the blade tip equivalent position Xt to thus measure the displacement of this continuous path C. For this reason, the measurement takes place on such a detoured path, but the measurement is carried out in a manner substantially equivalent to the direct measurement of the displacement between the center of the workpiece W and the blade tip of the tool 18 with due regards paid to the limit imposed by the structure of the machine tool and the control. Since the displacement in the direction (X-axis direction) perpendicular or substantially perpendicular to the spindle axis O between the surface of the workpiece W and the blade tip of the tool 18 is capable of being measured in a manner substantially equivalent to that by the direct measurement as hereinabove described, the processing accuracy in the cutting direction is increased.

Also, since the continuous path C, on which the displacement is measured, is a path within the region excluding the processing movement region E, which is a region in which the workpiece W and the tool 18 are moved relative to each other by the relative movement of the workpiece support unit 21 and the tool support unit 22 for processing, the displacement measuring unit 30 avoids undesirable interference between the workpiece W and the tool 18.

The position control of the X-axis drive mechanism 12 utilizing the measured value of the displacement measuring unit 33 by the X-axis drive control unit 44 is rendered to be an offset correction that corrects with a value by merely adding the respective measured values of the workpiece side and tool side linear position detecting units 31 and 32 of the displacement measuring unit 30 together or by multiplying it by a coefficient. For this reason, unlike that in which the thermal displacement correction is accomplished from a temperature measured value, an accurate correction is accomplished with a simplified calculation.

The workpiece side linear position detecting unit 31 and the tool side linear position detecting unit 32, both defining respective portions of the displacement measuring unit 30, are disposed on the common reference frame 40 which is installed at one location in the machine bed 3, which is a stationary bed, and which frame 40 is made of the low thermal expansion material. Therefore, regardless of the thermal displacement of the bed 3 and/or the X-axis drive mechanism 12, the distance between the workpiece W and the tool blade tip is accurately detected from the detection values of the workpiece side linear position detecting unit 31 and the tool side linear position detecting unit 32. In other words, ideally, the workpiece position and the tool position are detected after movement and/or the thermal deformation by the reference frame 40, which does not undergo the thermal information, and each of the workpiece side and tool side linear position detecting units 31 and 32.

For the reason described above, the provision of the correcting unit 47 configured to correct the X-axis command value with the use of the respective detection values of the workpiece side and tool side linear position detecting units 31 and 32 makes it possible to accomplish the processing with high accuracy without the thermal deformation correction being performed with the temperature detected value and to simplify the control system. The reference frame 40 is fixed at one location to the machine bed 3 and, therefore, it will not be adversely affected by a process induced force such as, for example, a cutting reactive force acting between the workpiece support unit 21 and the tool support unit 22, and also, it will not be affected by a deformation of the machine bed 3. Accordingly, no deformation will occur under the influence of the processing force, and, yet, the position detection with high accuracy is accomplished and an accurate processing is accomplished.

Also, in the lathe, of the processing accuracies in a cutting direction and the processing accuracy in a feed direction, the dimension in the cutting direction is required to have a further high accuracy. In the case of the preferred embodiment now under discussion, since both of the workpiece side linear position detecting unit 31 and the tool side linear position detecting unit 32 preferably are used to detect the position in the direction (X-axis direction) perpendicular or substantially perpendicular to the spindle center axis O, the position control in the cutting direction that is strongly desired to exhibit a high accuracy is accomplished highly precisely. Although detection of both of the cutting direction and the feed direction tends to result in complication in structure and is therefore difficult to achieve, in the preferred embodiment now under discussion only the cutting direction is detected by each of the workpiece side and tool side linear position detecting units 31 and 32 and the feed direction is controlled by the use of the position detector 14a that is accessory to the servo motor 14, and therefore, the required accuracy is satisfied while the complication is avoided. It is to be noted that in the preferred embodiment now under discussion, the thermal displacement correction in the Z-axis direction is unnecessary, but a suitable linearization unit and/or a correcting unit may be provided having been added to it.

Also, since in this preferred embodiment the displacement measuring unit 30 is preferably utilized for correction, each of the workpiece side and tool side linear position detecting units 31 and 32 that define respective portions of the displacement measuring unit 30 may be short unlike that which the displacement measuring unit 30 is used to perform the full closed control. For this reason, it is possible to procure and use the workpiece side and tool side linear position detecting units 31 and 32 that are inexpensive and highly accurate.

Figure 5:
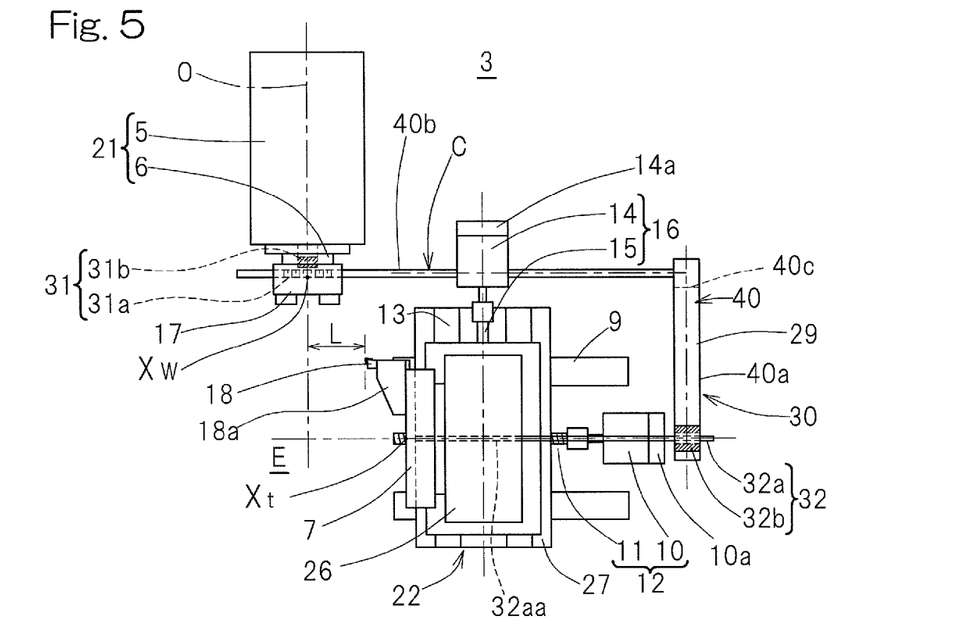
FIG. 5 is a top plan view showing the machine tool main body of the machine tool designed in accordance with a second preferred embodiment of the present invention.
Figure 6:
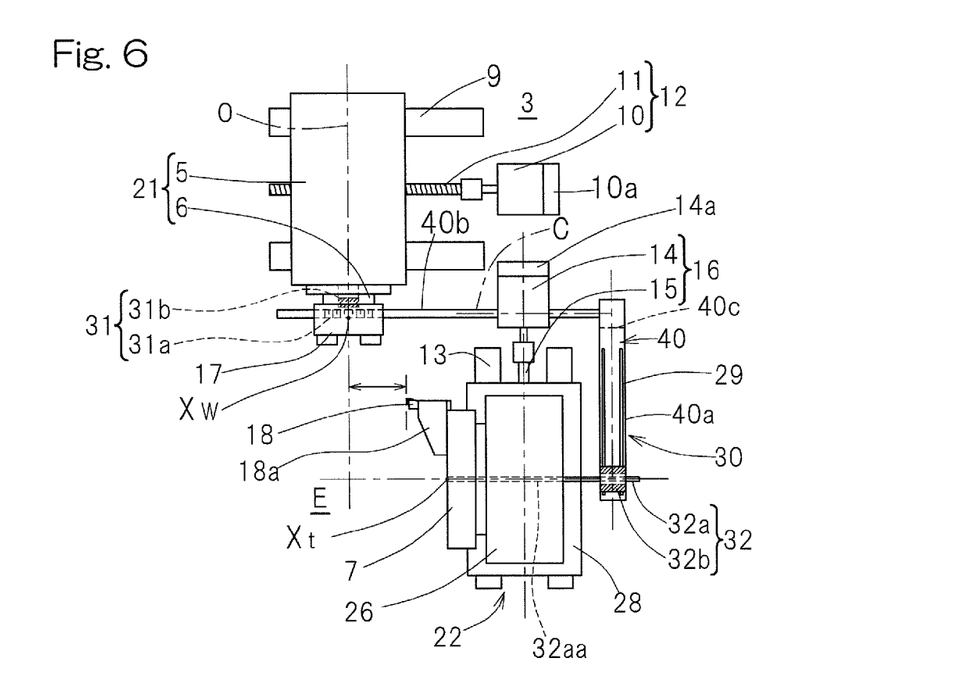
FIG. 6 is a top plan view showing the machine tool main body of the machine tool designed in accordance with a third preferred embodiment of the present invention.
Figure 7:
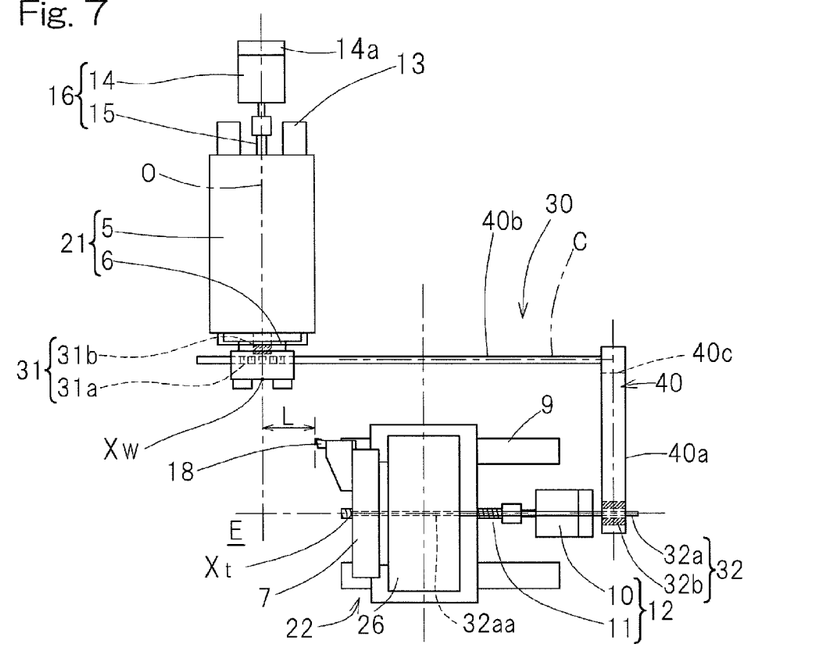
FIG. 7 is a top plan view showing the machine tool main body of the machine tool designed in accordance with a fourth preferred embodiment of the present invention.

While in describing the foregoing preferred embodiment, the present invention has been shown and described as preferably being applied to the lathe of the spindle moving type, for example, the present invention can be equally applied to the lathe of a tool post moving type shown in FIG. 5 and also to the lathe of spindle and tool post moving type as shown in FIGS. 6 and 7. It is to be noted in each of the following preferred embodiments of the present invention, components similar to those shown in FIGS. 1A and 1B to FIG. 4 and described in connection with the first preferred embodiment described above are referred by like reference numerals and, therefore, the details are not reiterated for the sake of brevity.

FIG. 5 illustrates the second preferred embodiment of the present invention which is preferably applied to the machine tool in the form of a lathe of a tool post moving type, for example. In this preferred embodiment, the workpiece support unit 21 is fixedly disposed in position on the machine bed 3 which is the stationary bed, and the tool support unit 22 is disposed on the feed slide 27, which is movable in the direction (X-axis direction) perpendicular or substantially perpendicular to the spindle axis O, for movement in a direction parallel or substantially parallel to the spindle axis O. The workpiece side linear position detecting unit 31 includes the first scale 31*a* provided in the transverse frame body 40*b* of the reference frame 40 and also includes the first readout head 31*b* provided in the workpiece support unit 21. The tool side linear position detecting unit 32 includes the second readout head 32*b* provided at a tip end of the axial frame body 40*a* of the reference frame 40 and also includes the second scale 32*a* provided in the tool support unit 22.

In the case of the configuration described above, in the machine tool of the tool post moving type, the displacement between the workpiece center and the blade tip of the tool 18 is measured by the displacement measuring unit in a mode as close as possible to that in which such displacement is directly measured and, hence, the processing accuracy is increased.

FIG. 6 illustrates the third preferred embodiment of the present invention which is preferably applied to the machine tool in the form of a lathe of a spindle and tool post moving type, for example, which is movable in the direction (X-axis direction) perpendicular or substantially perpendicular to the spindle axis O. In the third preferred embodiment, the head stock 5 of the workpiece support unit 21 is disposed on the machine bed 3, which is the stationary bed, for movement in the direction perpendicular or substantially perpendicular to the spindle axis O and the tool support unit 22 is disposed on the machine bed 3 for movement in the direction parallel or substantially parallel to the spindle axis O. The workpiece side linear position detecting unit 31 has its first scale 31*a* provided in the transverse frame body 40*b* of the reference frame 40 and also has its first readout head 31*b* provided in the workpiece support unit 21. The tool side linear position detecting unit 32 has its readout head 32*b* provided in the axial frame body 40*a* of the reference frame 40 and also has its second scale 32*a* provided in the tool support unit 22. Even in the configuration described above, the second readout head 32*b* in the tool side linear position detecting unit 32 is guided by a guide rail 29 for movement in a direction along the axis frame body 40*a* together with the first scale 31*a*, so that it will not hamper the movement of the tool post 7 in the Z-axis direction.

In the case of the above described configuration, in the machine tool of the spindle and the tool post moving type, in which the spindle 6 is moved in the direction perpendicular or substantially perpendicular to the spindle axis O, the distance between the workpiece center and the blade tip of the tool 18 is measured in a mode as close as possible to that in which such displacement is directly measured and, hence, the processing accuracy is increased.

FIG. 7 illustrates the fourth preferred embodiment of the present invention which is applied to the machine tool in the form of a lathe of the spindle and tool post moving type with the spindle being movable in a direction (Z-axis direction) parallel or substantially parallel to the spindle axis O. In this fourth preferred embodiment, the head stock 5 of the workpiece support unit 21 is disposed on the machine bed 3, which is the stationary bed, for movement in the direction (Z-axis direction) parallel or substantially parallel to the spindle axis P and the tool support unit 22 is disposed on the machine bed 3 for movement in the direction (X-axis direction) perpendicular or substantially perpendicular to the spindle axis O. The workpiece side linear position detecting unit 31 has its first scale 31*a* provided in the transverse frame body 40*b* of the reference frame 40 and also has its first readout head 31*b* provided in the workpiece support unit 21. The tool side linear position detecting unit 32 has its second readout head 32*b* provided in the reference frame 40 and also has its second scale 32*a* provided in the tool support unit 22.

In the case of the above described configuration, in the machine tool of the spindle and tool movable type in which the spindle 6 is movable in the direction of the spindle axis O, the distance between the workpiece center and the blade tip of the tool 18 is measured in a mode as close as possible to that in which such displacement is directly measured and, hence, the processing accuracy is increased.

It is to be noted that in the practice of each of the third and fourth preferred embodiments shown respectively in FIGS. 6 and 7, with respect to the sites at which the first and second scales 31*a* and 32*a* and the first and second readout heads 31*b* and 32*b* are disposed, whether they are disposed either on the side of the reference frame 40 or on a to-be-measured side such as, for example, the workpiece support unit 21, may be reversed relative to each other. Also, although in describing each of the foregoing preferred embodiments, the displacement measuring unit 30 has been shown and described as preferably including the two detecting units such as the workpiece side linear position detecting unit and the tool side linear position detecting unit, for example, a detecting unit configured to detect a displacement of the reference frame 40, for example, may be added so that the machine tool may have three detecting units in total, or, alternatively, the displacement measuring unit 30 as a whole may have only one detecting unit.

Although the present invention has been fully described in connection with the preferred embodiments thereof with reference to the accompanying drawings which are used only for the purpose of illustration, those skilled in the art will readily conceive numerous changes and modifications upon the reading of the specification herein presented of the present invention. For example, although in describing the preferred embodiments of the present invention reference has been made to the turret type lathe, preferred embodiments of the present invention are not limited to the turret type, but can be equally applied to, for example, a comb type lathe. Also, preferred embodiments of the present invention can be applied to any other machine tool than the lathe.

Accordingly, such changes and modifications are, unless they depart from the scope of the present invention included therein.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A machine tool comprising:
   a stationary bed;
   a workpiece support unit configured to support a workpiece;
   a tool support unit configured to support a tool, the workpiece support unit and the tool support unit being mounted on the stationary bed configured to selective advance and retract relative to each other in a direction parallel to a cutting direction;
   a drive mechanism to selectively advance and retract the workpiece support unit and the tool support unit relative to each other; and
   a displacement measuring unit configured to measure a displacement of a workpiece center-to-blade tip distance, the workpiece center-to-blade tip distance being a distance in the cutting direction between a center equivalent position of the workpiece support unit and a blade tip equivalent position of the tool support unit; wherein
   the center equivalent position of the workpiece support unit is located on a center axis of the workpiece support unit that extends in a direction perpendicular to the cutting direction;
   the blade tip equivalent position is located at a fixed distance from the blade tip in the cutting direction;
   the displacement measuring unit is provided on a continuous path between the center equivalent position of the workpiece support unit and the blade tip equivalent position, which path avoids a processing movement region in which the workpiece and the tool undergo a relative movement, and the displacement measuring unit is configured to measure the displacement of the workpiece center-to-blade tip distance by measuring the displacement of the continuous path, and
   the displacement measuring unit includes:
   a reference frame, which is made of a thermal expansion material having a lower coefficient of thermal expansion than that of the stationary bed and is disposed on the stationary bed positioned on the continuous path; and
   a linear position detecting unit including a scale extending in a direction parallel to the cutting direction and a readout head configured to read the scale, one of the scale and readout head being provided in the reference frame.

2. The machine tool as claimed in claim 1, wherein the reference frame includes:
   an axial frame body extending in a direction along a center axis of the workpiece support unit; and
   a transverse frame body extending in a direction perpendicular to the center axis;
   the linear position detecting unit includes:
   a workpiece side linear position detecting unit configured to measure the displacement between the center equivalent position of the workpiece support unit and the reference frame; and
   a tool side linear position detecting unit configured to measure a displacement between the blade tip position and the reference frame.

3. The machine tool as claimed in claim 2, wherein
   the tool support unit is fixedly disposed on the stationary bed and the workpiece support unit is provided on a feed slide, movable on the stationary bed in the direction perpendicular to the axis, for movement in the direction parallel to the axis;
   the workpiece side linear position detecting unit is configured such that one of the scale and the readout head is provided in the transverse frame body of the reference frame and the other of the scale and the readout head is provided on the feed slide; and
   the tool side linear position detecting unit is configured such that one of the scale and the readout head is provided in the axial frame body of the reference frame and the other of the scale and the readout head is provided in the tool support unit.

4. The machine tool as claimed in claim 2, wherein
   the workpiece support unit is fixedly positioned on the stationary bed, and the tool support unit is disposed on a feed slide, which is movable on the stationary bed in the direction perpendicular to the axis, for movement in the direction parallel to the axis;
   the workpiece side linear position detecting unit is configured such that one of the scale and the readout head is provided in the transverse frame body of the reference frame and the other of the scale and the readout head is provided in the workpiece support unit; and
   the tool side liner position detecting unit is configured such that one of the scale and the readout head is provided in the axial frame body of the reference frame and the other of the scale and the readout head is provided in the tool support unit.

5. The machine tool as claimed in claim 2, wherein
   the workpiece support unit is disposed on the stationary bed for movement in the direction perpendicular to the axis, and the tool support unit is disposed on the stationary bed for movement in the direction parallel to the axis;
   the workpiece side linear position detecting unit is configured such that one of the scale and the readout head is provided in the transverse frame body of the reference frame and the other of the scale and the readout head is provided in the workpiece support unit; and
   the tool side linear position detecting unit is configured such that one of the scale and the readout head is provided in the axial frame body of the reference frame and the other of the scale and the readout head is provided in the tool support unit.

6. The machine tool as claimed in claim 2, wherein
   the workpiece support unit is disposed on the stationary bed for movement in the direction parallel to the axis and the tool support unit is disposed on the stationary bed for movement in the direction perpendicular to the axis;
   the workpiece side linear position detecting unit is configured such that one of the scale and the readout head is provided in the transverse frame body of the reference frame and the other of the scale and the readout head is provided in the workpiece support unit; and
   the tool side linear position detecting unit is configured such that one of the scale and the readout head is provided in the reference frame and the other of the scale and the readout head is provided in the tool support unit.

7. The machine tool as claimed in claim 1, further comprising a control device configured and programmed to control the drive mechanism, wherein the control device includes:
- an X-axis drive control unit configured and programmed to control a motor to selectively advance and retract the workpiece support unit and the tool support unit relative to each other in the direction perpendicular to the axis;
- a calculation control unit configured and programmed to apply a command value to the X-axis drive control unit in response to a command value of a drive command of a processing program; and
- a correcting unit provided in the calculation control unit configured and programmed to correct the command value to be applied to the X-axis drive control unit in dependence on a measured value of the displacement of the displacement measuring unit.

* * * * *